July 29, 1958 W. R. JOHNSON 2,845,484

PLAY-BACK SYSTEM FOR RECORDED TELEVISION IMAGES

Filed June 11, 1954 3 Sheets-Sheet 1

INVENTOR.
WAYNE R. JOHNSON
BY
Lippincott & Smith
ATTORNEYS

July 29, 1958 W. R. JOHNSON 2,845,484

PLAY-BACK SYSTEM FOR RECORDED TELEVISION IMAGES

Filed June 11, 1954 3 Sheets-Sheet 2

INVENTOR.
WAYNE R. JOHNSON
BY
Lippincott & Smith
ATTORNEYS

PLAY-BACK SYSTEM FOR RECORDED TELEVISION IMAGES

Filed June 11, 1954 3 Sheets-Sheet 3

INVENTOR.
WAYNE R. JOHNSON

BY Lippincott & Smith

ATTORNEYS 2,845,484

PLAY-BACK SYSTEM FOR RECORDED TELEVISION IMAGES

Wayne R. Johnson, Los Angeles, Calif., assignor, by mesne assignments, to Minnesota Mining & Manufacturing Co., St. Paul, Minn., a corporation of Delaware Application June 11, 1954, Serial No. 436,190

11 Claims. (Cl. 178—5.6)

This invention relates to methods and apparatus for reproducing or playing back television signals, recorded on magnetic tape or other quasi-phonographic medium by the methods described in the copending applications Serial No. 195,612 of John T. Mullin, filed November 14, 1950, and entitled "System for Recording and Reproducing Television Signals," and of Wayne R. Johnson, Serial No. 272,083, filed February 18, 1952, and entitled "Television Recording and Reproducing System," applicant's Patents #2,694,748, dated November 16, 1954, and #2,695,331, dated November 23, 1954, and entitled respectively "Television Signal Reproducing System" and "System for Stabilizing Reproducers of Television Signals," particularly as modified by the copending application of Wayne R. Johnson, Serial No. 393,844, filed November 23, 1953, and entitled "Magnetic Tape Drop-Out Compensator."

Among the objects of the present invention are to provide means and methods for substantially doubling the amount of detail which can be presented on a television screen from a signal recorded within a specific frequency band; to provide apparatus wherein the number of recording heads and accompanying electronic circuits required for recording a signal carrying a given amount of visual detail is reduced by nearly one half; to provide various forms of apparatus whereby the above may be accomplished; to provide means and methods for reducing the effect of "drop-outs" occurring in magnetic tape recordings of television signals; to provide means and methods of reproducing recorded television signals wherein "dot structure" is eliminated from the reproduced signal; and to provide apparatus achieving the above results which is substantially free from highly critical adjustments and wherein such errors in alinement of recording and reproducing heads, tape speed, and other mechanical factors as are unavoidable are substantially without effect on the reproduced signal and the image produced thereby.

It is well known that the finest detail which can be resolved in a reproduced television image is that which corresponds to one-half cycle of the highest frequency within the spectrum represented by the television signal. In accordance with the system for recording and reproducing television signals which is disclosed in the various copending applications above mentioned, the signal to be recorded and reproduced is sampled by a succession of equally spaced pulses and these pulses are applied cyclically and in succession in a plurality of channels to modulate a plurality of carrier waves of the same frequency, the latter being a subharmonic of the sampling frequency. The carrier waves are mutually phase-displaced so that in each channel the crest of the carrier wave coincides with the instant of the sample in the channel concerned. The resultant carriers are simultaneously recorded upon a suitable medium, which is preferably a magnetic tape, as a plurality of tracks. The signals from all of the tracks are simultaneously reproduced in separate channels, and the reproduced carriers are sampled in the same order and time relation as the sampling of the original wave.

If the length of the sampling pulses used in the reproduction is substantially equal to one-half cycle of the highest frequency to be reproduced, the resolving power of the system approximates very closely that of the original signal, particularly as far as the reproduction of sharp edges or lines of demarcation between highlight and shadow are concerned. If, however, the repetition frequency of the sampling pulses is the highest frequency in the transmitted band and the length of the pulses is one-half cycle of this frequency the reproduced picture will have a dot-structure; every alternate picture element, and hence half of the detail proper to any one frame of the transmitted picture will be omitted.

It is also well known that a large proportion of the information carried by any television signal is redundant. The frames of the reproduced image follow each other in such rapid succession that there is very little change in information transmitted in any one frame from that which was transmitted in the previous frame. The only place where changes occur as between successive frames is where there is motion within the field of view, and in the vast majority of cases such motion is confined to a very small portion of the field. Furthermore, since successive fields are presented to view within the period of persistence of vision, the eye itself sees motion as very slightly blurred, the eye retaining, from instant to instant, the image of a moving object at the point where it previously existed.

As a result of the facts above presented it has not only been proposed, but systems have actually been constructed, which utilizes the principle of "dot interlace," wherein the details omitted in one frame of the reproduced image are supplied in a succeeding frame. In order to do this with the system of recording and reproduction considered herein the sampling frequency must be an odd harmonic of one-half the frame frequency. If this condition is met the details of the picture which were missing in one frame are supplied in the succeeding frame. In portions of the picture where no motion occurs all of the detail of the picture is supplied. Where there is motion only one-half of the detail appears in any one image, but because of the blurring of the successive images of the moving objects the eye does not recognize this fact and it appears that complete detail is transmitted.

The dot-interlace system is not, however, always entirely satisfactory. Under present standards of television transmission the frame frequency is 30 cycles per second and it requires 1/15 of a second to transmit the full picture detail by dot interlace. The period of persistence of vision, if it be defined as the period within which changes of illumination or "flicker" cannot be recognized, depends upon a number of factors, among which are the size of the area which is flickering, and the magnitude of the changes in intensity. The greater the illumination the more readily can flicker be recognized, and for high degrees of illumination or highlights 15 cycles is a readily appreciable rate. A picture reproduced in this manner carries, it is true, substantially all of the required information, but superposed upon this information is an effect of "crawl" or "boiling" which can be highly disturbing to the viewer.

In accordance with the present invention the broad principle of dot interlace as above described is retained. The television signal is recorded and sampled as has been described above and as is disclosed in further detail in the various copending applications for patent above mentioned. In reproduction the dot signals, representing the samples, are separated into two paths. In one of these paths the signals are delayed or stored for a period equal to that of one frame, while those in the other path are transmitted undelayed. The two paths are then rejoined into a common path wherein samples representing the frame currently reproduced alternate with samples transmitted during the immediately preceding frame, resulting in a signal which contains substantially all of the information within the field of view. The delay or storage of the signals can be accomplished in one of several well known memory devices, such as one of several types of image storage tubes, or on a magnetic drum. Furthermore, as disclosed in copending application Serial No. 393,844 above identified, the low frequency information may be recorded on a separate track or tracks, without going through the sampling process, and such low frequency information can be removed from the sampled information before it is stored and only the current low frequency information added to the composite sampled signals.

It will be seen that with the arrangement thus described there will at all times be transmitted two images of such portions of the field as contain moving objects, each of these images containing half of the detail, the two images representing the position of the object at two intervals of time separated by 1/15 second. It is only where the motion of the object is extremely rapid that the concurrent representation of the object in two different positions is disturbing or can even be noticed. Examples of the situation in which this effect can be observed are images of a thrown or batted baseball, or of a rapidly moving automobile very close to the lens of the camera which picks up the original signal. Psychologically the effect of the doubly reproduced image is to intensify somewhat the stroboscopic effect which can be seen in any event in signals of this character. There are, therefore, a few situations where the quality of the reproduced image is slightly deteriorated in comparison with that reproduced from a signal recorded at double the sampling rate. These situations are, however, so few relative to the total number of frames transmitted, the degradation in quality is so slight, and the amount of apparatus employed is so much less and its precision requirements are so greatly reduced in comparison with the signals sampled at double the frequency that the advantages of the invention as here disclosed are obvious.

Several means and methods for accomplishing the broad result contemplated by the invention will be described and are illustrated in the accompanying drawings wherein.

Figure 1:
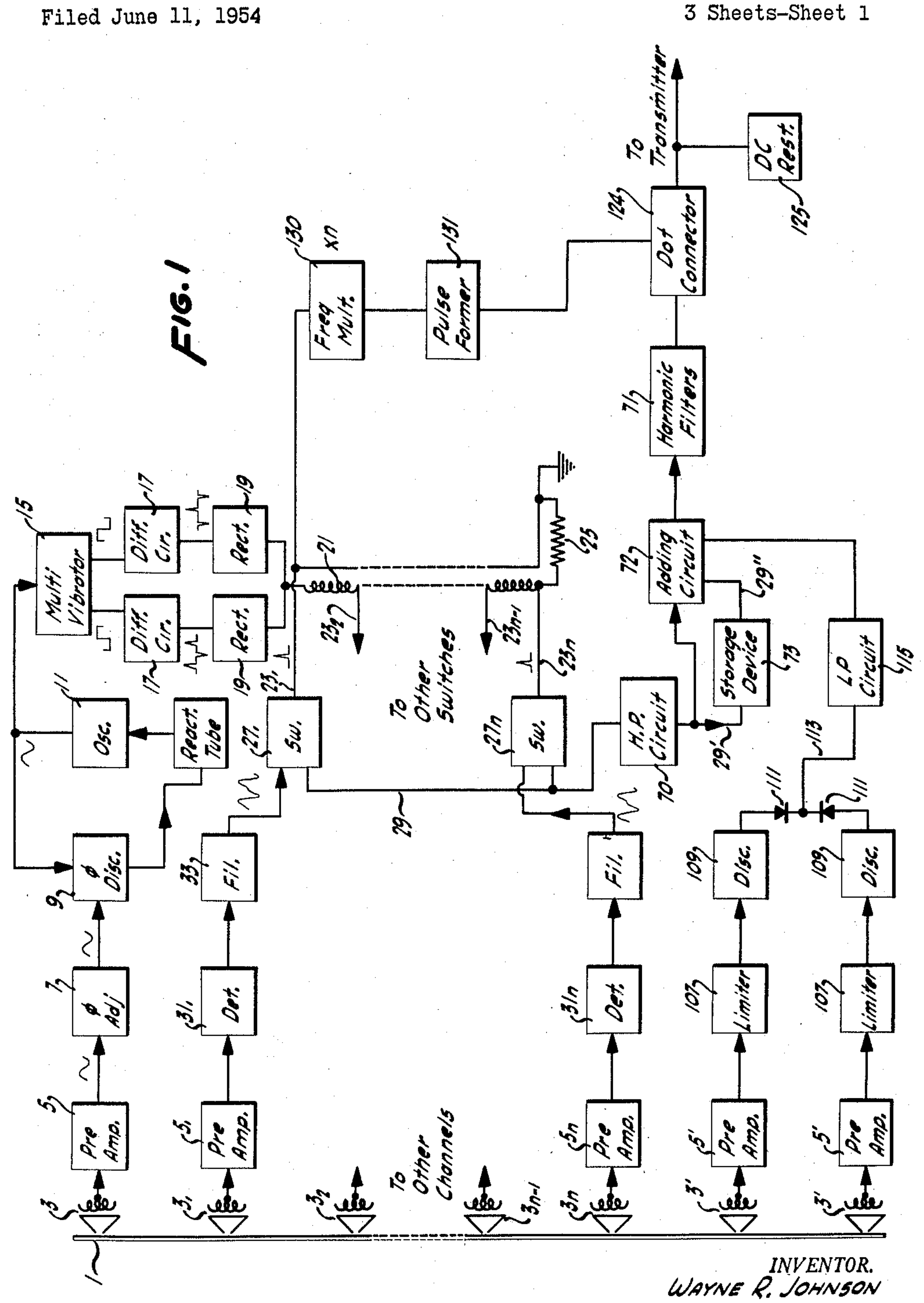
Fig. 1 is a block diagram illustrating the essential elements of a reproducer embodying the invention.

In Fig. 1 the magnetic tape on which the signals are recorded is represented in an exaggerated cross-section and designated by the reference character 1. The signal, recorded on this medium, is picked up by a plurality of magnetic transducer heads. In this instance the tracks recorded on the tape include a timing track, which is engaged by transducer head 3, and a plurality of tracks, $n$ in number, on which the signals are recorded as modulated waves of substantially sine wave form, the waves being mutually phase-displaced by incremental angles $$\frac{\pi}{n+1}$$

each crest, positive and negative, of each of the carrier waves representing in value a sample of the recorded television signal. Transducer heads $3_1$ to $3_n$ engage these tracks. Finally, there may be included two additional tracks, engaged by transducer heads 3′ engaging tracks on which the low-frequency components only of the signal have been recorded, preferably carried by a frequency modulated wave.

Connected to the output of each of the transducer heads thus identified is a preamplifier 5. Since, with the signals modulated in the manner here described, these preamplifiers may all be identical, no distinction is made between those supplied by the various transducer heads. Each of the preamplifiers may be conventional in construction, and in general resistance-capacitance coupled amplifiers will be used.

Transducer head 3 with its preamplifier feeds first a phase adjuster 7, and through this phase adjuster a phase discriminator 9. The discriminator is also supplied by an oscillator 11, which is stabilized as to the amplitude of its output circuit. The phases of the oscillations as developed by the oscillator 11 and reproduced from the timing track are compared in the phase discriminator 9, which delivers a D. C. error signal to a reactance tube 13, coupled across the frequency determining or tank circuit of the oscillator 11. As this arrangement has been described in detail in several of the prior applications and patents above identified, e. g., in Patent #2,695,331, it is believed unnecessary to go into further detail. The purpose of this arrangement is to provide a sampling wave of constant amplitude and of the proper timing frequency, even though the timing wave from the track may be momentarily lost through "drop-outs" occurring as a result of pin holes or nodules in the magnetic coating of the tape.

The oscillations from oscillator 11 drive a bistable multivibrator 15. Leads from the two anodes of the multivibrator carry square waves of timing frequency and opposite phase to differentiating circuits 17. The negative pulses developed in the differentiating circuits are removed by shunt rectifiers 19 and the two circuits from the multivibrator are thereafter combined to supply pulses of double the common carrier frequency and of a length which is substantially equal to one-half cycle of the sampling frequency to a delay line 21.

The total length of the delay line is such as to delay the pulses reaching its distant end by an electrical angle $$\frac{\pi n}{n+1}$$

with respect to the common carrier frequency. The line is divided into $n-1$ equal sections, with lines $23_1$ to $23_n$ tapping off at the input and output ends and at each intermediate tap. The delay line is closed by resistor 25, the value of which is the characteristic impedance of the line, to prevent reflections. The pulses transmitted down the line therefore arrive at the various leads $23_1$ to $23_n$ relatively delayed in phase in the same manner as the waves recorded on the various tracks. Other means of supplying phase-displaced pulse trains may, of course, be used. That here described is typical.

The pulses transmitted down the delay line and supplied to the leads $23_1$ to $23_n$ actuate switches $27_1$ to $27_n$ to connect the signals from the channels carrying the modulated carrier waves to a bus or common lead 29.

In each of these channels is a detector circuit, $31_1$ to $31_n$, fed by the preamplifiers in these various channels. Following each detector, between it and the sampling switch, there is preferably included one or more filter sections $33_1$—$33_n$ for eliminating the second and preferably higher harmonics of the sampling frequency. These may be simple antiresonant circuits tuned to carrier harmonics. The effect of these is to deliver to the sampling switches waves which are substantially the envelopes of the modulated carriers, as described in copending application Serial No. 436,189, filed concurrently herewith and entitled "Reproducer for Recorded Television Signals."

Figure 2:
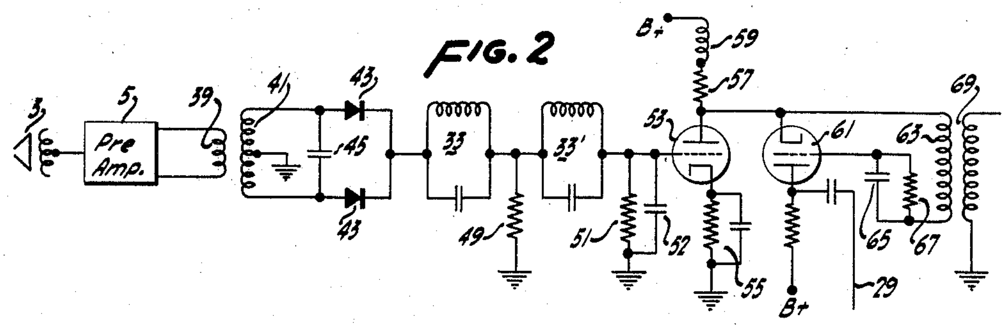
Fig. 2 is a diagram, largely schematic although partly in block, of a single decoding channel as illustrated in Fig. 1.

A preferred arrangement of detector, filters and sampling switch is illustrated in greater detail in Fig. 2. This figure illustrates one channel, for convenience the first, carrying the amplitude-modulated or sampled signal. Up to and including the preamplifier 5 this channel is shown in block form. The output of the preamplifier is illustrated as a transformer whose primary coil 39 is the output of the last stage of the preamplifier. This couples to a secondary coil 41 which has a grounded center tap and which feeds a conventional full-wave detector comprising a pair of rectifiers 43, the input sides of which are connected to the two ends of the secondary coil and whose outputs connect in parallel. The joint outputs from the two rectifiers connect to antiresonant circuits 33, 33', tuned to the second and higher harmonics of the common carrier frequency. Resistors 49 and 51 connect from the junction between the antiresonant circuits and from the output side of circuit 33' to ground. A small integrating condenser 52 is bridged across resistor 51. The potential across the resistor will then follow closely the envelope of the modulated wave. It is this signal which is sampled by the switch 27.

One form which the switch 27 may take is illustrated in Fig. 2. In this case the output from the detector circuit is applied to the grid of a tube 53. The cathode of this tube is self-biased by a resistor-capacitor circuit 55 in customary manner and anode potential is supplied through an anode resistor 57, which may be supplemented by a high frequency choke 59. A triode 61 has its cathode connected to the anode of tube 53. The grid of the tube 61 is connected back to its cathode through the secondary coil 63 of a pulse transformer and an integrating circuit comprising a condenser 65 in parallel with a leak resistor 67. The time constant of the integrating circuit is made long in comparison with the period of the carrier and the recurrence frequency of the sampling pulses. These pulses are applied positively to the grid from the delay line through the primary coil 69 of the pulse transformer. The plate of tube 61 connects to the video bus 29 as described in connection with Fig. 1.

As a result of the positive pulses, which are large in amplitude when compared to the amplitude of the envelope wave from the detector, grid current from tube 61 flows into the condenser 65 at each pulse, and due to the long time constant of the circuit 65—67 the grid current charges condenser 65 to substantially the peak value of the pulses, so that in the absence of a pulse the tube is cut off. The pulses themselves pass through condenser 65 essentially unattenuated since the impedance of this condenser to the pulse frequencies is low. Accordingly tube 61 passes current only during the actual period of the pulse, and the current which flows is dependent upon the potential of the anode of the tube 53 and cathode of tube 61. The outputs of the channel is therefore delivered to the bus 29 in pure dot form.

As in the case of the detector circuit, the switch 27 illustrates only one form of many which may be used. Other forms are illustrated in the various prior applications hereinbefore identified and numerous other pulse operated switches or gating circuits are well known. So far as the present application is concerned, the only requirement is that the output of the switch shall be disconnected pulses which would appear on the screen of a television receiver as dots, and that these dots be short enough so that, as fed into the bus circuit 29, which is connected to all of the switches in common, the dots be separated by intervals which are approximately equal to or less than the length of the pulses themselves.

Returning to Fig. 1, bus 29 divides into two parts, preferably, however, following an interposed high pass filter 70 whose function will be discussed below. One of these paths connects to a group of harmonic filters 71 (as described in copending application Serial No. 404,587) through an adding circuit 72. The second branch, designated as 29', connects to a storage device 73, which is so constituted as to delay the signal delivered to it by precisely the period of one frame of the picture to be reproduced, and deliver the delayed signal to lead 29'', which rejoins lead 29 through adding circuit 72 at its input to the filter 71.

There are several forms of delay or storage devices which will accomplish the desired purpose. Of these the type which is at present preferred is one of various forms of storage tubes, several varieties of which are described in "Storage Tubes" by Knoll and Kazan, Wiley, 1952. Several of the tubes there described may be used for the purposes of this invention. That which is preferred is the "Radechon," this particular form of device also being described in greater detail in an article in the "RCA Review," vol. IX, March 1948, pp. 112–135. The essentials of such a tube are shown in highly schematic form in Fig. 3 together with the connections through which it is associated with the equipment heretofore described.

The storage device itself comprises a cathode-ray tube 75 which in many respects is identical with the ordinary cathode-ray oscilloscope. In the form shown it comprises the usual flask- or funnel-shaped envelope, having mounted in the neck thereof an electron gun comprising an electron emitting cathode 77, and one or more accelerating anodes 79 which are connected to a suitable source which is positive with respect to the cathode—in this case ground, the cathode being operated about 1500 volts negative. As in the ordinary oscilloscope the gun is adapted to generate a beam of cathode rays in a direction normal to a target area occupying the larger end of the tube. The beam passes between two sets of deflecting plates, one pair of plates 81 deflecting the beam in a (nominally) vertical direction when a potential difference is applied therebetween; the other pair of plates 81' deflecting the beam horizontally. These plates are excited respectively by a vertical oscillator 83 and a horizontal oscillator 84. Each of these oscillators develops a saw-tooth waveform, the vertical oscillator at either frame or field frequency and the horizontal oscillator at the much higher, line frequency, so as to deflect the beam in a rectangular raster or pattern which may be essentially identical with that used for the display of images in a television receiver. These oscillators may be synchronized in the same general fashion as is employed in television receiver practice, and the synchronizing frequency may be derived from the reproduced signals themselves, using well known techniques. They should, however, be operated in synchronism with the television signals, so that the fly-back will occur in the blanking interevals when the total signal is zero. It is to be understood that as in the case of television receiver tubes the beam is focused so that it is of very small cross-section when it reaches the plane of the target. Such focusing can be accomplished either by a magnetic focusing coil encircling the neck of the tube or by a proper arrangement of gun anodes. Neither of these arrangements is shown, since both are well known and conventional and their inclusion in the drawing would merely add complexity. It is also to be understood that magnetic deflection of the beam may be used if desired instead of the electrostatic deflection shown, these two methods of producing a raster being well known equivalents.

The target of the tube comprises a thin charge-storing plate of insulating material 85, which may be glass, provided with a metal back plate 87. Spaced a very short distance from the insulating or charge plate 85 and in the path of the electron beam is a barrier grid 89 of very fine wire mesh. Surrounding the path of the beam, as deflected, is a collector electrode 91.

Leads are brought out through the wall of the tube from the back plate, the barrier grid, and the collector. The barrier grid is connected to a constant potential source which is about 400 volts negative to the final anode of the electron gun. Back plate 87 connects to the grid-potential source through an input load resistor 93. Collector 91 operates at final anode potential connecting to ground through an output resistor 95. It is to be understood that all the potentials mentioned are relative, and that the biasing or normal potential of any of the electrodes mentioned may be held at ground value as long as the other biases have approximately the right value. All of the biasing potentials mentioned can be taken from the ordinary type of high voltage supply as long as the latter is sufficiently well filtered to avoid the appearance of A. C. ripple in the output. It should also be mentioned that the vertical oscillator 83 may operate either at the 60-cycle field frequency, if standard television pictures are being transmitted, or at one-half this frequency (the frame frequency) or 30 cycles. In one case the record left on the storage plate will be of an interlaced field as in the case of ordinary television reproduction. In the second case the signals representing the "odd" and "even" fields will be stored as two separate charge images, one above the other, instead of the lines being interlaced. There is some advantage in the latter procedure minimizing "cross-talk" due to pairing of lines but theoretically it makes no difference which of the two arrangements is used.

The device operates because any insulator bombarded by an electron beam accelerated by an electric field will arrive at an equilibrium potential at which the electrons arriving at the surface from the beam become equal in number to the secondary electrons emitted as a result of primary electron impact. What this equilibrium potential may be, depends upon the velocity of the impact of the electron beam and the material bombarded.

The dot signals from the bus 29 are applied across the resistor 93 through a blocking condenser 97. Changes in potential of the back plate 87 affect capacitively the effective potential of the opposing surface of the plate 85. The electron beam, as it scans the plate 85 from point to point, is of sufficient electron density to bring each point of the charge plate to its equilibrium value. All electrons passing through the barrier grid in the beam either remain as charges on the plate 85 or cause the emission of an equal number of secondary electrons, which pass through the grid and are eventually collected on the electrode 91, returning to the cathode through resistor 95.

The first time the target area is scanned by the electron beam a charge pattern is "written" on the plate. If, at the second scanning, the back plate potential is the same as it was the first time the plate was scanned, the infalling primary electrons are exactly equal to the secondaries emitted and collected by the collector electrode 91, and the current passing through the output resistor 95 is almost precisely equal in value to the beam current, differing therefrom only by a very small current collected by the barrier grid. If, however, the back plate has changed in potential between the first and second scannings of a given point, the charge plate will either emit more secondaries or less, whichever is required to re-establish equilibrium at each point; in the first case the current through resistor 95 will increase while in the second case it will decrease. The amount of increase or decrease will be substantially identical to the difference between two charges on the back plate, since very few electrons will actually be collected by the barrier grid.

It has already been indicated that the sampling frequency—i. e., the dot frequency—of the recorded signals is an odd harmonic of one-half the frame frequency. Because of this fact each dot in the input signal for one frame falls in the interval between two dots of the preceding frame; i. e., the interval between samples represents a zero light-level value. Each time the target area is scanned, therefore, the input signal corresponding to any individual elementary area of the charge plate represents either a zero level of illumination or a positive level. Since the output signal represents the difference between two successive scannings, the alternating component of the signal through resistor 95 represents substantially identically the signal written on the charge plate 85 at the last preceding scanning, one frame earlier. Each scanning of the storage plate therefore accomplishes, in effect, three separate processes. First, it "writes" the signal currently reproduced from the magnetic tape. Second, it "reads" the signal imposed upon the plate at the last preceding scanning and in this reading effectively erases the preceding signal. The particular type of storage tube described is therefore particularly adapted to the purposes of the present invention. Other types of tubes may be used, but most of them require a switching operation between the writing and the reading of the signals.

The dot components of the reproduced signals as picked up by the collector 91 are applied through a blocking condenser 99 to the grid of a cathode follower tube 101. The cathode output of the latter tube is taken off through leads 29″ which connects to the harmonic filters 71. Simultaneously, signals from the lead 29 are applied through a blocking condenser 102 to the grid of a similar cathode follower tube 103 and fed to the harmonic filters jointly with the signals from lead 29′. Together these signals represent all the high frequency components recorded and reproduced from two successive frames on the magnetic tape, plus such low-frequency components as will pass the blocking condensers 99 and 102 if the high-pass filter 70 is omitted, as it may be.

These signals are combined in the adding circuit 72. Of various possible forms which circuit 72 may take, one of the simplest is that shown in Fig. 3; the cathode-follower tubes 101 and 103 are each provided with an individual cathode resistor 104, 104′, which connects to a common cathode resistor 105. The voltage drop across the latter is then proportional to the sum of the currents in resistors 104, 104′. This voltage is supplied to filters 71, preferably through a blocking condenser 123.

The use of the harmonic filters has been explained in prior application Serial No. 404,587 cited above. These are narrow "slot" filters—band elimination filters—tuned to successive harmonics of the carrier frequency from the fundamental up to and including the *n*th, which is the sampling frequency. These filters remove any spurious frequencies which may be introduced by unbalance between the constants of the various channels.

If the high pass filter 70 were omitted the output of the adding circuit (as thus far described) would represent a complete television picture and, as has been indicated above, the filter 70 is not essential to the practice of the invention. Through its use, however, in combination with other elements later to be described, the reproduced images may be materially improved through the substantial elimination of the visual effect of drop-outs.

It will have been realized that the D. C. and very low frequency components of the picture signals which represent the average illumination of the field-of-view will have been removed by the various blocking condensers included in the circuit. Because, under present standards of transmission the blanking pulses transmitted at the end of each scanning line represents zero illumination and the "D. C." or background level is equal to the average amplitude of the higher frequency components, the background level can be re-established by a "D. C. restorer" as is done in all commercially sold television receivers. Excellent pictures have been reproduced wherein all frequencies below a cut-off of 10 kc. were supplied by a D. C. restorer of relatively short time constant—somewhere in the neighborhood of a few milliseconds. The blocking condensers such as condenser 99 therefore remove no necessary information from the signal as long as they are large enough to pass frequencies as low as the line frequency substantially unattenuated.

It is the low-frequency components, however, which introduce noticeable effects where drop-outs occur. In the absence of drop-outs, all of the sampled channels carry the same low-frequency information, defining as "low frequency" all frequencies which are below about one-third of the common carrier frequency. Where a drop-out occurs the low-frequency content of the signal supplied to the storage device drops by $1/n$th, and a drop-out usually affects several lines. The high-frequency content also vanishes, but this is not usually observable. The reduction in amplitude also affects the D. C. restorer, if its time constant is short. In effect a drop-out is a negative wave, whose period is of the order, usually, of several hundred microseconds, which appears in one sampled channel only.

The visible effects of drop-outs can be practically wholly eliminated, therefore, by filtering out the low-frequency components from the sampled waves by a high-pass circuit and then adding, in the final output, a drop-out-free wave carrying the low-frequency components only, the high-frequency components having been removed by a conjugate, low-pass circuit. The filters may be of the simplest form—series RC circuits, for example—as long as they are properly matched and their phase-rotation characteristics are complementary.

The cut-off value of the high-pass circuit 70 is not critical; it should preferably be higher than the line-frequency and preferably a little below the maximum frequency at which the information carried by all of the sampled channels is the same. A cut-off at one-third the carrier frequency is a fair compromise. In the prior applications herein cited the use of a carrier frequency of about 170 kc. is suitable. A series RC circuit having a time constant of three microseconds falls within this range, the high-frequency components being taken off across the resistance element.

It is not, of course, necessary that the removal of the H. F. components be done in a single circuit. If condenser 97 and resistor 93 are of such value as to have the required time constant, and condenser 102 and the grid-resistor 106 of the tube 103 have the same time constant, the same effect will be secured. This requires critical matching, however, which is avoided if a single circuit 70 is used, in which case condensers 99 and 102 are preferably large enough to offer negligible impedance to frequencies down to well below cut-off value.

If the low-frequency components are removed from the sampled waves as thus described and as is preferred, they are re-established in the final output circuit from the tracks picked up by transducer heads 3'. These heads engage tracks on which the low-frequency components have either been frequency-modulated or on which they have been directly recorded. Duplicate tracks and corresponding channels are provided for the low frequencies, so that in case of a drop-out in one the information will not be lost.

After preamplification in amplifiers 5' the signals, if frequency modulated, are passed through conventional limiters 107 to frequency discriminators 109 where they are demodulated and then combined in a single channel. The demodulated signals carry the D.-C. component and hence are unidirectional. A rectifier 111 is shown included between each discriminator and the junction with the common channel, but if the discriminator impedance is high in comparison with the impedance of the signal channel these can be dispensed with. If included they act to switch only the signal of greater amplitude into the common lead 113. A similar arrangement can be used with a directly recorded L. F. signal for the same purpose.

Figure 3:
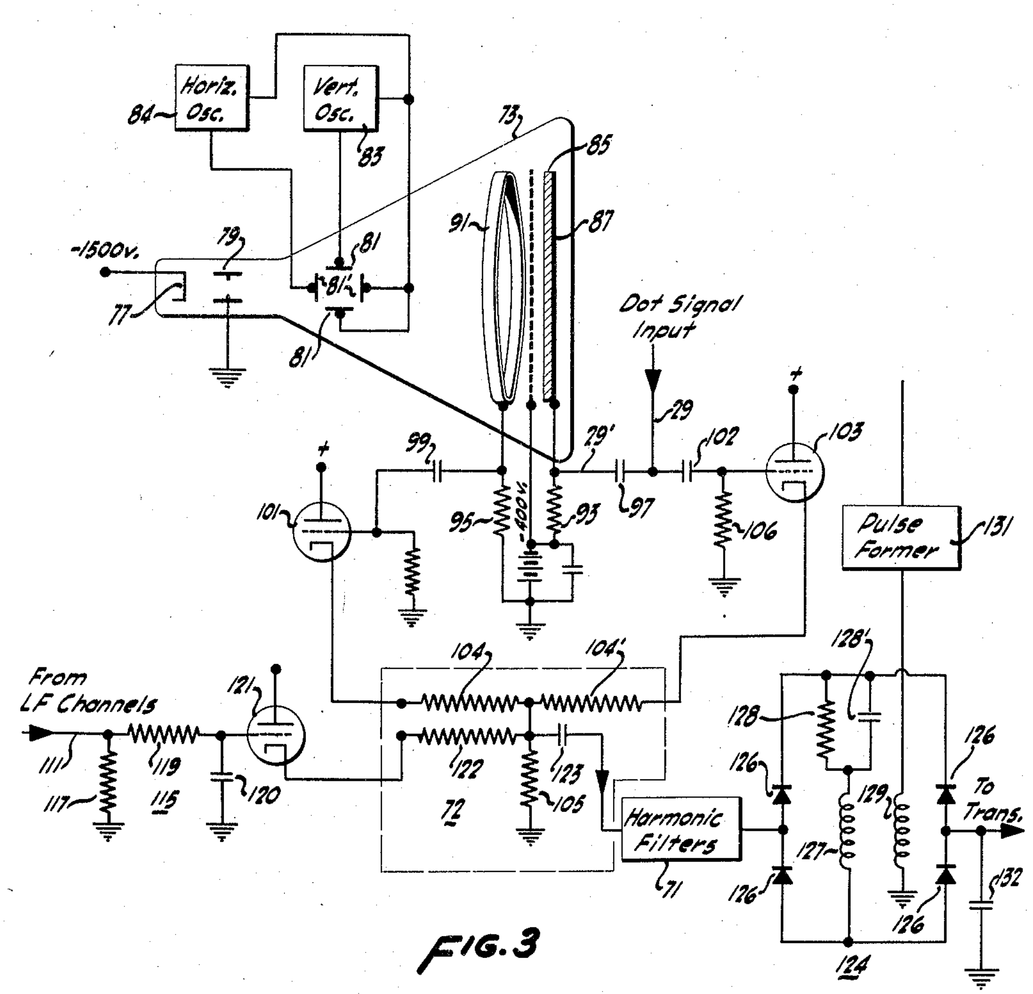
Fig. 3 is a schematic diagram illustrating one form of storage device, together with its auxiliary equipment.

Lead 113 connects through a low-pass circuit 115 to adding circuit 72. These last two elements are shown in Fig. 3. A resistor 117 connects from lead 113 to ground. Across this resistor is shunted the low-pass circuit comprising a resistor 119 and condenser 120 in series. The grid of a cathode-follower tube 121 connects to the resistor-condenser junction, and the voltage appearing on the grid is then the drop across the condenser.

The resistance of the resistor 117 should be low as compared to that of resistor 119 or should bear the same ratio thereto to that of a like resistor across the input of the low-pass circuit 70. The phase relations across the various elements of the high-pass and low-pass circuits will then be the same, but the output voltage of the high-pass circuit is taken across the resistor while that of the low-pass circuit appears across the condenser. The time constant of the circuit 119—120 must be substantially equal to that of the corresponding low-pass circuit. At cut-off the output voltages of the high-pass and low-pass circuits will be the same, $$\frac{1}{\sqrt{2}}$$

times the voltage across the network, but in quadrature; the high-pass output leading the network input by 45°, the low-pass output lagging. The vector sum is equal to the network input.

The cathode of tube 121 connects into the adding network through a resistor 122 connecting to the junction of resistors 104, 104' and 105. The voltage across the latter represents the complete re-assembled signal. Because, however, a spurious D.-C. component may exist in this signal owing to the space-currents from tubes 101, 103 and 121 through resistor 105, it is preferred to filter out the frequencies below, say 30 cycles, with a large blocking condenser 125, before passing the signal on to the harmonic filters 71.

Furthermore, in the event that there is unbalance in the various channels the dots may not be of equal width, so that some may overlap while gaps appear between others. A similar effect may occur if there is any "jitter" in the scanning frequency supplied to the storage tube. In either of the latter events portions of the picture field would exhibit dot structure while others would not. In the usual case the transmitter band filters will themselves remove the dot structure, but in certain applications they may not do so.

Intermittent overlap is most likely to occur at the carrier frequency itself, or its harmonics. The slot filters remove all visible effects of this character as well as the effects of unbalance between channels.

If there is a low-frequency "jitter" in the storage tube scanning, so that dots representing successive frames overlap, there may result an output component of the sampling frequency, which, if removed, would take with it much of the picture information. This can be prevented, and the over-all quality of the picture improved, by omitting the sampling frequency ($n$th) harmonic filter and incorporating a "dot connector" 124 between the filter group and the output line to the transmitter. A conventional D.-C. restorer 125 as used in substantially all television receivers, is connected to the line following the dot-connector 124.

The dot connector is essentially a synchronous detector of known type but used in a somewhat unconventional fashion. As shown in Fig. 3 it comprises four diodes or other rectifiers 126 connected as the arms of a bridge circuit.

One diagonal of the bridge is in series between the filters and the transmitter. Across the other diagonal an actuating circuit is connected comprising the secondary coil 127 of a pulse transformer in series with a parallel RC circuit comprising a resistor 128 and condenser 128'. The primary 129 of the pulse transformer is supplied with pulses of repetition frequency $2n$ times carrier frequency from a frequency multiplier 130 and pulse former 131 which are locked to the carrier frequency. For example, the multiplier may be of the well known harmonic generator type driven by the pulses fed to the delay line. The pulse former may be of any conventional type which will supply pulses shorter than the "dots" of the re-assembled signal. The rectifiers 126 are all poled in the same direction with respect to the actuating circuit.

With this arrangement it will be seen that looking into the bridge circuit from the filters 71 there are two rectifiers, oppositely poled, in each branch, so that no current can flow to the transmitter directly through either in the absence of additional voltages in the circuit, although there is a path in either direction via the actuating circuit and one-half of each branch. The pulse induced in the pulse-transformer secondary 127 are in such direction that the rectifiers conduct and are of greater amplitude than the maximum signal voltage. When they occur current can flow to the transmitter circuit as long as the pulse persists, charging condenser 132. The condenser 128 of the RC circuit accumulates a charge which so biases rectifiers 126 that they cannot conduct and connect the input and output of the video-signal leads through the actuating circuit except during the pulse.

Under these circumstances any double-sampling-frequency component in the output vanishes, provided the input to the transmitter is of sufficiently high impedance to prevent material discharge of condenser 132 between the switch-actuating pulses, and that the condenser will charge during the brief interval when the switch is closed. While more complex than the filter method of eliminating the last vestige of dots it is less subject to misadjustment and presents a better picture when operating condiions are unfavorable.

Figure 4:
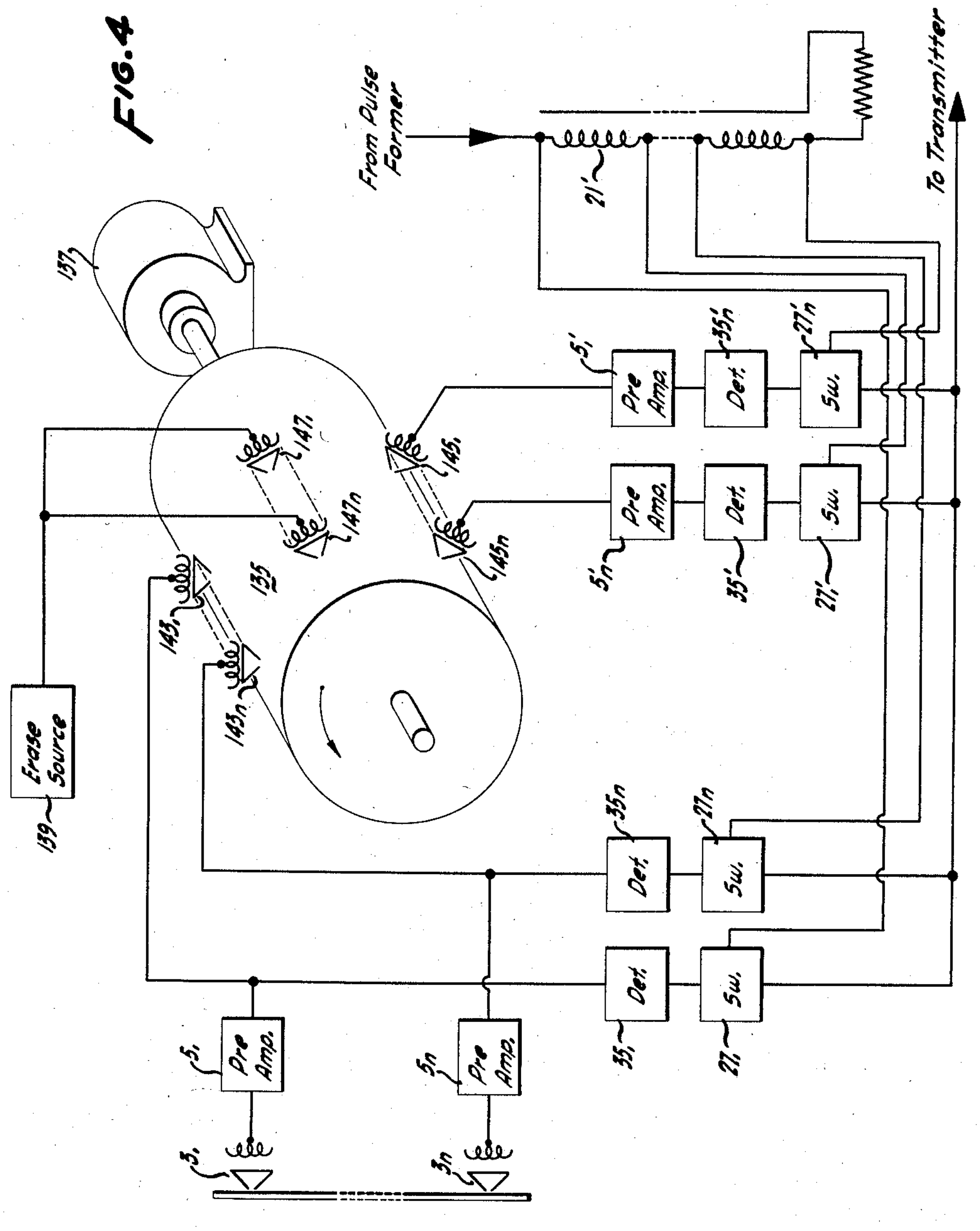
Fig. 4 is a diagram generally similar to that of Fig. 2, illustrating a system wherein the signal is stored or delayed for a period of one frame by means of a magnetic drum prior to resampling for reproduction.

Fig. 4 shows apparatus which may be employed to apply the principle of dot interlace through a delay of one frame in an entirely different manner. In this instance the delay or storage of the signal is accomplished by means of a rotating magnetic drum. This modification of the method of the invention is illustrated in purely schematic form in the figure, wherein the drum 135 is indicated as being driven by a six pole synchronous motor 137, the supply frequency to this motor being the 60-cycle field frequency in the case of pictures transmitted at the present black-and-white standard of 30 frames or 60 fields per second. The drum accordingly makes precisely two-thirds of a revolution per frame. Apposed to the surface of the drum are a plurality of recording heads $143_1$ to $143_n$, the number of heads thus corresponding in number to the reproducing heads $3_1$ to $3_n$ used for picking up the sample-modulated signals. After preamplification in the amplifiers $5_1$ to $5_n$ the signals picked up by heads $3_1$ to $3_n$ are divided into two paths, the first paths connecting directly to the corresponding heads $143_1$—$143_n$ on the drum. Positioned precisely at an angle of 240° around the axis of the drum 135 is a corresponding plurality of pickup heads $145_1$ to $145_n$ engaging the tracks produced by the heads 143. Between the pickup heads and the recording heads, in the direction of the rotation of the drum, is a series of erasing heads $147_1$ to $147_n$. These latter heads are supplied in common from a source of erasing current 139. This may be either the D. C. or high frequency. It is also possible to use a permanent magnet eraser in this position if a D. C. bias is used in recording; otherwise it is preferable to use a high-frequency erasing current. Both of these expedients are well known in the magnetic recording art. Each of the preamplifiers 5 feeds, in the second branch of the output circuit, a detector 35, and the output of these detectors connect to decoding switches $27_1$ to $27_n$, this branch of each circuit being, if desired, identical with that shown in Fig. 2. Pickup heads $145_1$ to $145_n$ connect through preamplifiers 5' to detector circuits 35' and thence to switches $27_1'$ to $27_n'$. Detectors and switches distinguished by primes may be identical with those illustrated in Fig. 2 or whatever other form is used for switches designated by the unprimed numbers.

The switches are actuated by pulses from a delay line 21' which differs only from that illustrated in Fig. 1 in being divided into double the number of sections, the total length of the line being the same. The various switches are connected to the delay line sections in such order that the pulses actuate first switch $27_1$, next switch $27_1'$, and so on, down to switches $27_n$ and $27_n'$ in that order. If the sampling frequency is an odd harmonic of one-half the frame frequency (and preferably also an odd harmonic of one-half the line frequency) with the method of sampling here disclosed the carrier frequency will necessarily be an odd harmonic of one-quarter the frame frequency and it follows that the phase of the carrier as recorded on any one track will be either advanced or retarded by 90 electrical degrees in each successive frame. The above description of the connection of the various switches to the delay line assumes that the sampling and carrier frequency are so chosen that the phase of the carrier advances by 90° in each frame. If the sampling frequency is chosen so that the phase is retarded by 90° in successive frames the connections to switches bearing the primed and unprimed numbers are reversed with respect to the delay line.

All of the switches 27 connect to a common output, the connection preferably made through a cathode follower with blocking condensers and the D. C. component restored as has already been described in connection with the first embodiment of the invention. It should be apparent that in this case as in the first embodiment, the low-frequency component can be filtered out and restored. Since the equipment for accomplishing this would be the same as would the first embodiment it appears unnecessary to repeat the description.

A drum such as has been here referred to has frequently been used as a "memory" in computing apparatus and therefore it is considered unnecessary to cover its construction in detail. Such a drum has a very considerable mass and therefore tends to rotate at a very constant speed. It can be driven through a mechanical filter of well known character, such as is used in both motion picture sound recording practice and in tape recording practice to reduce the very small changes in speed which cause "wow."

Certain of the principles of the apparatus shown in Figs. 3 and 4 can be combined. The limitations on the feed of the recording medium which apply with respect to a tape which must bear a large amount of information at one time are not effective with respect to a drum which need only carry information with regard to a single frame of a picture. A tape, traveling 100 inches per second, concentrates the information for an entire frame in 3⅓ inches; if the record wavelength on the tape on the drum were to be the same the drum would therefore have to be only 1½ inches in diameter. A drum 15 inches in diameter would record frequencies ten times as high with equal fidelity. It is therefore quite possible to record dot signals directly on the drum in the same manner as they are recorded on the charge plate 85 of the storage tube of Fig. 3. This would, of course, require extreme accuracy in the adjustment of the pickup heads with relation to the recording heads. This difficulty can be avoided by using the same heads for recording and reproducing and driving the drum with a four pole synchronous motor through a suitable mechanical filter, in which case the drum will make precisely one revolution per frame, since the pickup and recording heads are the same, the pickup and recording is necessarily exactly 360° apart. Theoretically, at least, only two heads would be needed; these would be switched from input to output circuits during the blanking period at the end of each frame, each frame acting first to pick up and then to record in successive frames. With proper biasing of the heads erasure of the preceding signal can be accomplished at the same time as the recording of the current one, but this sometimes results in some cross-talk due to imperfect erasure of preceding signals.

If desired, therefore, this can be avoided by using a bank of three heads which are switched to "record," "reproduce," and "erase" conditions in rotation. Similar arrangements can also be used with types of storage tubes wherein writing, reading and erasure are separate and distinct processes.

Because of the additional complexity of these various modifications and because they all involve merely switching operations of a character similar to those already described and which are otherwise well known, it appears unnecessary to illustrate them specifically as they are all well understood by those skilled in the art. The two ways of accomplishing the results contemplated in the invention which have been shown have been chosen as embodying apparatus of the most diverse type. Other embodiments of the apparatus of the invention can be considered as intermediate those disclosed in detail. In view of the wide differences in apparatus and the important, but less striking, differences in the application of the method of the invention, it will be clear that the equipment actually described is not to be considered to be limiting, all limitations upon the scope of the invention being expressed in the following claims.

I claim:

1. The method of recording and reproducing a television signal produced by scanning a field of view in one dimension at a frame frequency, and in an orthogonal dimension at a line frequency which is an integral multiple of said frame frequency, which comprises the steps of sampling said signal at a rate which is an odd multiple of one-half said frame frequency and equal to the highest frequency component in the signal to be reproduced, reproducibly recording the samples on a suitable medium, translating the recorded samples to produce electric waves representative of the successive samples, dividing said waves into two paths, delaying the waves in one of said paths for an interval equal to the period of said frame frequency and combining the undelayed waves in the other of said paths with the delayed waves from said first path to produce a composite signal representative of samples of the original signal currently translated from said medium interleaved with samples so translated one period of said frame frequency previously.

2. The method of reproducing a recorded television signal originally produced by scanning a field of view in one dimension at a frame frequency and in an orthogonal direction at a line frequency which is an integral multiple of said frame frequency and recorded as waves the amplitudes whereof are proportional to samples of said signal taken at a sampling rate which is an odd multiple of one-half of said frame frequency and one-half of the highest frequency to be reproduced, which comprises the steps of translating the recorded waves into a train of electrical waves representative of the recorded samples in the order in which said signal was sampled, dividing said train of waves into two paths, delaying the waves in one of said paths for an interval equal to the period of said frame frequency, and combining the undelayed waves in the other of said paths with the delayed waves from said first path to produce a composite signal representative of samples of the original signal currently translated from said medium interleaved with samples so translated one period of said frame frequency previously.

3. The method of recording and reproducing television signals representative of a field of view which is repetitively scanned at a frame frequency which comprises the steps of sampling said signals at a rate substantially equal to the highest component frequency of said signals which it is desired to reproduce, the intervals during which the sampling occurs being substantially equal to one-half period of said sampling rate and said sampling rate being an odd integral multiple of one-half of said frame frequency, recording the sampled signal on a suitable medium, translating the recorded signal into electrical waves, dividing said waves into separate channels, delaying the signals in one of said channels for an interval equal to one period of said frame frequency, and adding the delayed signals to undelayed signals from the other channel to constitute a substantially continuous signal.

4. The method of recording and reproducing television or like signals generated by scanning a field of view repetitively at a frame frequency which comprises sampling the signals generated in scanning successive frames at regularly spaced intervals such that the samples are taken in each frame at epochs of the scanning intermediate the epochs at which the signals corresponding to the preceding frame was sampled, recording the sampled signals, translating the recorded signals into trains of electrical pulses, dividing said trains of pulses into two paths, delaying the train of signals in one path for an interval equal to the period of said frame frequency, and combining the delayed signal with undelayed signals from the other of said paths.

5. The method as defined in claim 4 which includes in the step of sampling the original signal, sampling said signal during periods substantially equal to the intervals between samples.

6. The method as defined in claim 5 which includes in the step of sampling the original signal, sampling said signal during intervals substantially equal to one-half period of the highest frequency component of said signal.

7. The method of reproducing television or like signals developed by scanning a field of view in one direction at a frame frequency and in a direction substantially normal to the frame frequency scanning at a rate which is an integral multiple of said frame frequency, from a medium on which at least the higher frequency information in said signals is recorded as waves the crest values whereof are proportional to samples of the instantaneous amplitudes of the said signals taken at uniform intervals substantially equal to the periods of the highest frequency to be reproduced, the period during which each sample is taken corresponding substantially to one-half cycle of said highest frequency and the frequency of sampling being an odd integral multiple of said frame frequency, which comprises the steps of reproducing said signals as pulses whose lengths at the instantaneous amplitudes correspond to said samples, dividing said reproduced waves into two paths, delaying the waves in one path for an interval equal to the period of said frame frequency, and combining the delayed signals with undelayed signals from the other path to produce a composite signal wherein pulses representative of each frame scanned are interleaved with pulses representative of the preceding frame.

8. The method as defined in claim 7 which includes the step of removing from the combined signals components of double the sampling frequency.

9. The method of reproducing a television signal developed by repeatedly scanning a field of view at a constant frame frequency of repetition from a medium on which at least the high frequency component of said signal are derived by a sampling process wherein the signal to be recorded is sampled for intervals substantially equal to one-half cycle of the highest frequency to be reproduced and at a sampling frequency which is an odd multiple of one-half of said frame frequency, which comprises translating the recorded signal into waves comprising pulses corresponding in length and amplitude to the samples, separating each pulse into two separate paths, delaying the portion of each pulse in one path for an interval equal to one period of said frame frequency, and recombining the delayed pulses from said one path with undelayed pulses from the other path to produce a wave representative of interleaved pulses developed by the scanning of one with pulses derived from scanning the next preceding frame.

10. The method of producing television or like signals developed by repeatedly scanning a field of view at a frame frequency and recorded as samples of said signal taken at a substantially constant frequency which is an odd multiple of one-half of said frame frequency, each sample representing a pulse the length whereof is substantially equal to one-half cycle of said sampling frequency which comprises the steps of reproducing said samples, rerecording said samples, reproducing the rerecorded samples after an interval equal to one period of said frame frequency, and combining said last mentioned reproduced samples with samples currently reproduced from said medium to provide a composite signal wherein samples developed from a scanning of one frame are interleaved with samples developed from the scanning of a preceding frame.

11. The method of reproducing television signals developed by scanning of a field of view repeatedly at a frame frequency and recorded as a plurality of tracks on a suitable medium, at least one of said tracks being representative of low frequency components only of said signal, the high frequency components of said signals being recorded as samples developed from said signals by repeatedly sampling at a constant frequency which is an odd multiple of one-half of the frame frequency, which comprises reproducing from a recorded track a signal representative of said low frequency components, developing from other of said tracks signals representative of the high frequency components only of said samples, rerecording said last mentioned signals, rereproducing said last mentioned signals after an interval equal to one period of said frame frequency, and combining the reproduced low frequency component with both the reproduced and the rereproduced sample signal to provide a signal wherein the high frequency components are representative of samples of each frame scanned interleaved with samples of a preceding frame.

References Cited in the file of this patent

UNITED STATES PATENTS

| | | |
|---|---|---|
| 2,694,748 | Johnson | Nov. 16, 1954 |
| 2,695,331 | Johnson | Nov. 23, 1954 |

OTHER REFERENCES

Principles of NTSC Compatible Color Television, Electronics, February 1952, pages 89–97. (Copy in U. S. Pat. Off. Lib.)